July 29, 1958 — J. E. HALL, SR — 2,845,287
CENTER TAPERED STOP COLLAR ASSEMBLY
Filed Dec. 14, 1954
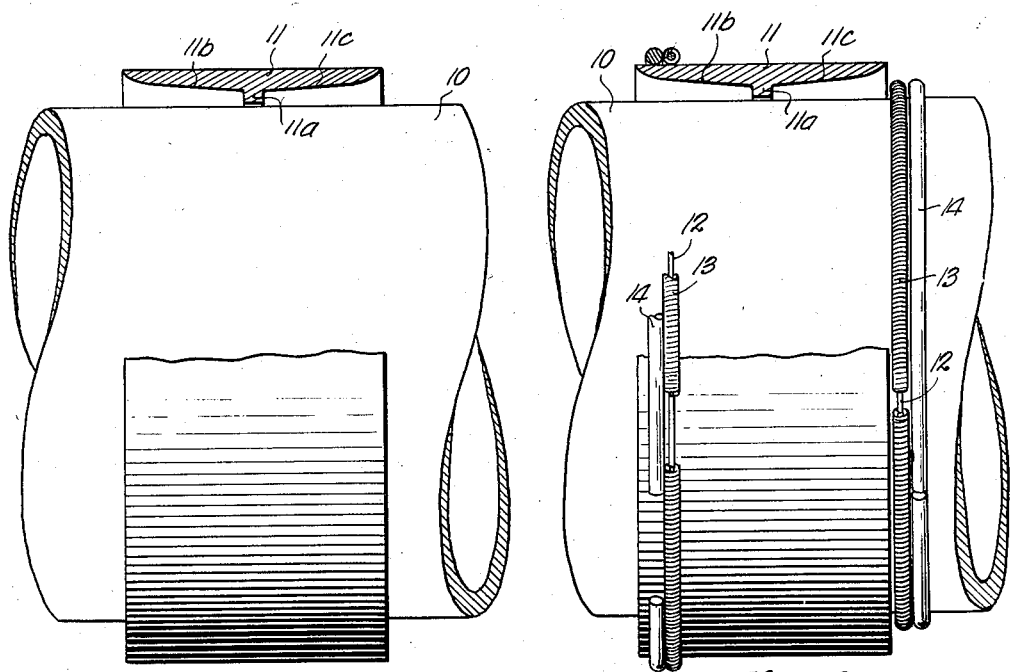
Fig. 1.
Fig. 2.
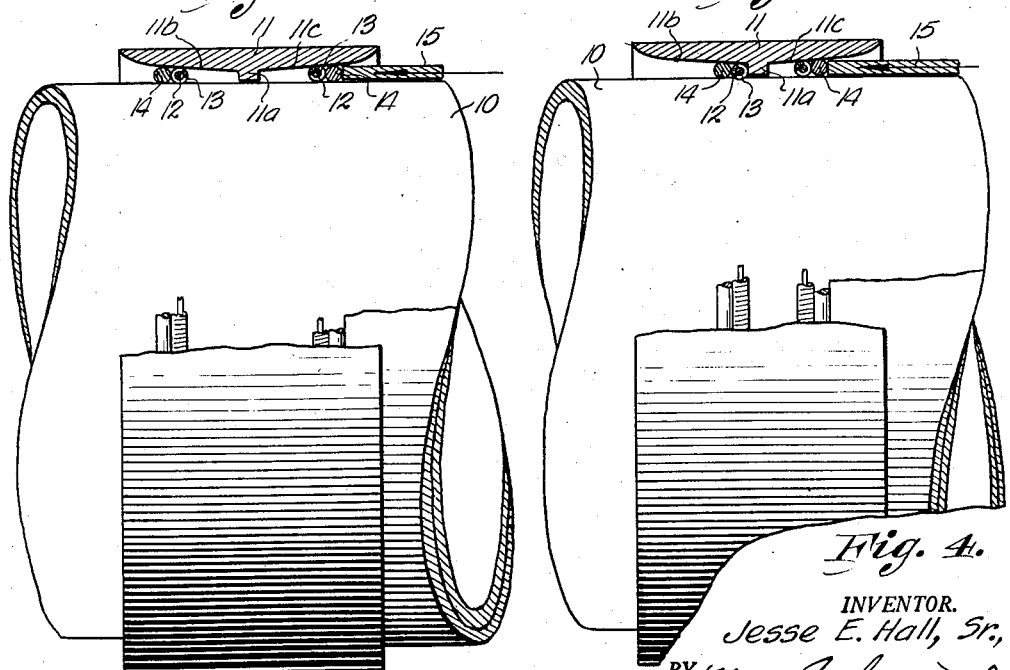
Fig. 3.
Fig. 4.
INVENTOR.
Jesse E. Hall, Sr.,
BY Thos. E. Scofield
ATTORNEY.

United States Patent Office 2,845,287
Patented July 29, 1958

2,845,287

CENTER TAPERED STOP COLLAR ASSEMBLY

Jesse E. Hall, Sr., Weatherford, Tex.

Application December 14, 1954, Serial No. 475,227

2 Claims. (Cl. 287—52.09)

This invention relates to improvements in center tapered stop collar assemblies for mounting tools upon the exterior of casing or pipe used in oil or water wells and refers more particularly to a stop collar construction utilizing a sleeve having tapered internal surfaces and wedge and holding rings positioned between the casing and collar to rigidly fix the collar on the casing by pressure gripping engagement, the tapered inner surfaces of the collar or sleeve being inclined oppositely from the outer edges toward its midsection.

This application is a continuation-in-part of an application Serial 256,194 filed November 14, 1951, now Patent No. 2,797,756, an application Serial No. 273,005 filed February 23, 1952, now Patent No. 2,801,700, and an application Serial 438,504 filed June 22, 1954.

The welding of tools or tool mountings to pipe and casing has become increasingly objectionable with the deepening of drilling operations and the manufacture of casing of greater strength to meet the stresses, strains and loads imposed by present-day production methods. The weakening of casing by welding tools or tool mountings on the wall of the casing often introduces difficulties and sometimes serious consequences which are prevented and avoided by a mounting which relies upon pressure gripping and frictional engagement.

An object therefore of this invention is to provide a stop collar construction easily slid over a pipe or casing section whose outside diameter is no greater than the outside diameter of the casing or pipe couplings.

Another object is to provide a stop collar or tool mounting whose attachment to the exterior of the casing is such that it will withstand the excessive longitudinal pressures to which it is subjected without displacement.

A further object is to provide a stop collar assembly which is easily located at any desired position along the casing string and rigidly affixed to the casing or pipe by sheer gripping pressures applied by the wedging of rings between the casing and tapered surfaces of the collar.

Another object is to provide a stop collar construction which is exceedingly strong and rugged and designed to withstand the abuse to which it is subjected in deep well operations without slipping or failure.

Still another object is to provide a stop collar which is relatively inexpensive to manufacture, simple to install by unskilled labor and yet effective and efficient as a tool mounting.

Other and further objects and advantages will appear from the description which follows.

In the accompanying drawings which form a part of the specification and are to be read in conjunction therewith, there is shown a preferred embodiment of the invention.

Fig. 1 is a side elevation of the collar or sleeve portion of the stop collar assembly mounted on a casing.

Fig. 2 is a view similar to Fig. 1 with the wedge and holding rings in an inoperable position.

Fig. 3 is a similar view to Figs. 1 and 2 with the wedge and holding rings positioned between the casing and tapered surfaces of the collar preparatory to setting the collar on the casing.

Fig. 4 shows the collar in similar relationship to the casing as the previous views with the collar shifted to the left to shift the wedge and snap rings in an operable position and fix the collar rigidly upon the casing.

Referring to the drawings at 10 is shown a short length of casing positioned horizontally with a sleeve or collar 11 mounted thereon. The inside diameter of the collar 11 at the medial stop ridge or barrier 11a is sufficiently larger than the external diameter of the casing to permit the collar to be easily slid upon and moved longitudinally of the casing. Collar 11 has a plain exterior surface which is substantially parallel to the axis of the casing. The interior of the collar besides the medial stop ridge or barrier 11a comprises two oppositely inclined or tapered surfaces 11b and 11c. These surfaces shown best in the cross-sectional portions of the drawings are inclined or tapered from the outer edges of the collar toward the mid-section or center and terminate at the base of the barrier or inner circumferential ridge 11a. Thus the inside diameter of the sleeve 11 is greatest at its edges and smallest at its mid-section.

To mount the collar rigidly upon the casing, there is used a pair of rings, one a wedge ring comprising a wire core 12 surrounded by a coil spring 13, the other a solid wire holding or snap ring 14. These rings are preferably split rings to facilitate wrapping them about the periphery of the casing. The diameter of the wedge ring is slightly larger than the outside diameter of the casing while the diameter of the holding ring is slightly smaller than the outside diameter of the casing. This variance in diameters of the two rings is advantageous since the function of the wedge ring is to afford ample wedging surface between the casing and tapered interior surfaces of the collar while that of the holding rings is to aid and assist the wedge rings in gripping the casing and preventing displacement of the wedge rings after they have been located between the casing and the tapered surfaces of the collar.

The degree of taper of the internal surfaces of the collar is critical since their angle of inclination is the important factor in rolling the wedge rings into position without slippage. If these pressure surfaces are properly tapered, the wedge rings will be squeezed or wedged with sufficient force to indent or groove the pipe surface giving the holding effect of screw thread engagement. Movement of the collar longitudinally along the casing or pipe in one direction sets the rings ahead of the central stop ridge or barrier. Movement of the collar in the opposite direction releases the gripping engagement of the rings then holding the collar in a fixed position, and sets the rings on the opposite side of the barrier or stop ridge. In other words, the diameter of the wedge ring and the taper of the collar must bear such relationship as to put enough pressure upon the wedge roller for efficient holding of the collar when the collar is moved longitudinally of the pipe in either direction. This taper must also take into consideration, make allowances for and meet discrepancies in pipe size tolerances which may vary a few thousandths one way or another and thereby affect the gripping relationship which is dependent upon the wedge ring and tapered surface cooperation. A five degree taper has proved satisfactory in actual practice. The tapered surfaces adjacent the edges of the collar may be circumferentially grooved to provide storage place for the snap rings when moved to an inoperative position or the taper can be increased as shown in the drawings without grooving to facilitate insertion of the rings.

In Fig. 2 there is shown one set of the rings upon the casing; the other set surrounds the exterior of the collar; both sets being in an inoperable relationship with respect to the collar and casing. In Fig. 3 the wedge rings and holding or snap rings have been inserted beneath the tapered surfaces of the sleeve or collar, but the sleeve has not been moved longitudinally of the casing to fix the collar on the casing. In Fig. 4 the collar 15 of a tool which is to be mounted on the casing has been shifted against the collar and the collar slid longitudinally of the casing so the wedge ring to the left of the central ridge or barrier 11a is tightly squeezed between the tapered surface of the collar and the exterior of the casing. The wedge ring also abuts the central stop ridge in which position it has been squeezed against the casing by the tapered surface 11b with sufficient force to indent a groove completely about the periphery of the collar rigidly fixing the collar against further movement toward the left. The snap or holding ring 14 likewise has been wedged between the collar and casing immediately adjoining the wedge ring. The tool 15 has moved against the stop collar and is held permanently by the collar from further movement to the left. While the casing and stop collar in the drawings are shown in a horizontal position, they would be vertically positioned in a well so movement of the collar would be up or down along the exterior surface of the casing instead of in a horizontal direction.

While the wedge rings or rollers shown are constructed of a core of solid wires with a wire coil surrounding the core, it is contemplated as well under certain circumstances that solid wires may be used both for the wedge rings as well as the snap or holding rings. For situation or applications where the collars may be subjected to relatively high longitudinal pressures, a helical coil spring surrounding a core of solid wire has been found to give better gripping engagement and is subject to less slippage than is the solid wire. The coil type wedge wire also is more positively acted upon by the tapered surfaces and therefore grooves the casing in a manner simulating the threaded engagement, producing a stop less likely to slippage and failure than is the solid wire wedge ring.

Stop collars of the type shown may be used separately or may be constructed as an attachment to the tools themselves as shown in my copending applications, in which case the stop collar becomes an integral part of the tool. The stop collars herein described are particularly adapted for mounting scratchers, centralizers, cement baskets and other oil well or water well tools which are attached on the exterior of the casing.

Where the tapered surfaces slope from the edges toward the center of the collar, a collar of considerably greater strength may be provided. Also, the internal stop ridge or barrier running circumferentially of the inside surface of the collar at its midsection provides additional strength to the construction while not materially increasing its diameter. Stop collars of the type shown have been made and tested which will easily withstand longitudinal pressures without slippage of upwards of 20,000 to 30,000 pounds per square inch, and when these excessive pressures are imposed, the tapered surface squeezes the wedge ring and snap ring against the exterior of the pipe with pressures sufficient to groove the pipe and give the effect of threaded engagement. The central barrier or ridge furnishes an effective abutment for the wedge ring when the collar is moved in either direction, cooperating with the tapered surfaces and rings to provide rigid attachment of the collar to the casing.

Thus it will be seen that the invention is well adapted to attain the ends and objects hereinbefore set forth, together with such other advantages as are obvious and inherent to the structure. It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A stop collar assembly for mounting tools on the exterior of pipe or tubular casing comprising a sleeve whose inside diameter provides an easy sliding fit upon the casing, oppositely inclined circular surfaces internally of the sleeve tapering from its outer edges toward its mid section, the greatest inside diameter of the sleeve being adjacent the edges, the lesser diameter at the mid section, wedge rings possessing an internal diameter at least equal to the outer diameter of the casing when mounted thereon and an outer diameter less than the greatest internal diameter of the sleeve when mounted on the casing, said wedge rings when positioned between the casing and the inclined surfaces of the inner faces of the sleeve adapted to cooperate with the collar and casing surfaces with longitudinal movement of the collar upon the casing to rigidly fix the collar thereto.

2. A stop collar assembly as in claim 1 including snap rings having an internal diameter and an outer diameter essentially equal to those of the wedge rings and insertable with the wedge rings between the tapered surfaces of the collar and the exterior surface of the casing.

References Cited in the file of this patent

UNITED STATES PATENTS

| | | |
|---|---|---|
| 1,538,703 | Johnston | May 19, 1925 |
| 1,888,539 | Otterson | Nov. 22, 1932 |
| 2,184,376 | Beyer | Dec. 26, 1939 |
| 2,201,372 | Miller | May 21, 1940 |
| 2,226,304 | Dillon | Dec. 24, 1940 |
| 2,358,408 | McMurray | Sept. 19, 1944 |